US005366061A

United States Patent [19]

Kruse et al.

[11] Patent Number: 5,366,061

[45] Date of Patent: Nov. 22, 1994

[54] HANDRAIL GUIDE ASSEMBLY FOR ESCALATOR NEWEL

[75] Inventors: Michael Kruse, Minden; Hans-Dietrich Riedel, Berlin, both of Germany

[73] Assignee: Otis Elevator Company, Farmington, Conn.

[21] Appl. No.: 998,098

[22] Filed: Dec. 30, 1992

[51] Int. Cl.[5] .............................................. B65G 15/00

[52] U.S. Cl. .................................................... 198/335

[58] Field of Search ................ 198/335, 337, 338, 841

[56] References Cited

U.S. PATENT DOCUMENTS 5,115,900 5/1992 Nurnberg et al. .................. 198/335

5,181,595 1/1993 Tietz et al. .......................... 198/335

FOREIGN PATENT DOCUMENTS 2203177 8/1973 Germany ............................ 198/335

*Primary Examiner*—Cheryl L. Gastineau

[57] ABSTRACT

The moving handrail of an escalator or moving walkway is guided around the curved newel of the escalator balustrade by a plastic guide system. A metal base member is frictionally fitted onto the outer edge of the glass balustrade. An extruded aluminum profile is mounted in the upper and outer surface of the base. A series of spaced pads formed from a low coefficient of friction plastic are fixed to the profile to form the contact sliding surface for the handrail.

7 Claims, 2 Drawing Sheets

HANDRAIL GUIDE ASSEMBLY FOR ESCALATOR NEWEL

TECHNICAL FIELD

This invention relates to a handrail guide for the newel sections of an escalator or moving walkway.

BACKGROUND ART

People movers such as escalators or moving walkways are generally configured so that the steps or treads move from an entrance landing to an exit landing, when transporting passengers, along a first path of travel, and then they reverse their direction of movement to return from the exit landing to the entrance landing along a second path of travel which lies directly beneath the first path of travel. They also generally include moving handrails mounted on step-flanking balustrades, which handrails follow somewhat similar transport and return paths of travel. When the handrails move from the transport to return paths of travel, and vice versa, they pass over curved newels at the ends of the balustrades. When the handrails move along a generally rectilinear path on the balustrades, they merely slide over fixed tracks mounted on the balustrades, but when the handrails pass over the newels which are curved, the prior art indicates that there would be too much friction generated if a fixed track were used, thus they must pass over a rolling guide. In the prior art, two different approaches have been used to guide the handrails around the curved newels. The first solution to the problem involved using a large rotating wheel or pulley at each newel. The wheels were hidden in the balustrade housing and the handrail passed from the track onto the wheel, and thence around the newel. U.S. Pat. No. 2,632,550, granted Mar. 24, 1953 to C. Panter; and U.S. Pat. No. 2,669,339, granted Feb. 16, 1954 to H. E. Hansen illustrate this solution to the problem. This solution was acceptable for earlier escalators which were relatively bulky mechanisms, but cannot be used in the streamlined, more modern escalators or walkways which have thin balustrades, often made of glass, or some other transparent material.

In the streamlined modern escalators and moving walkways, the prior art solution to the problem involves the use of a plurality of spaced roller bearings mounted on the handrail guide rail along the newel portion thereof. The handrail rides on the roller bearings during passage over the newels. This solution is disclosed in U.S. Pat. No. 3,283,878, granted Nov. 8, 1966 to L. R. Rissler; U.S. Pat. No. 3,442,367, granted May 6, 1969 to D. E. Van Voorhis; U.S. Pat. No. 3,595,364, granted Jul. 27, 1971 to K. Schoneweiss, et al.; U.S. Pat. No. 3,623,589, granted Nov. 30, 1971 to E. D. Johnson, et al.; U.S. Pat. No. 4,273,232, granted Jun. 16, 1981 to C. Saito, et al; and Swiss Patent No. 426,148 dated Dec. 15, 1966. A problem which arises in connection with this solution concerns the use of the roller bearings. The roller bearings used employ a roller system which has a central ball roller set and flanking pin roller sets. The ball rollers are about 3 mm in diameter and the pin rollers are about 1.5 mm in diameter. In a standard escalator newel, the ball rollers rotate at about 100 rpm, and the pin rollers rotate faster. This high speed of rotation results in high heat generation and high levels of noise. It is also apparent that the rollers in the roller bearings are delicate and are known to require replacement at an undesirable frequency.

DISCLOSURE OF THE INVENTION

This invention relates to a people mover handrail newel guide which uses fixed handrail-contacting supports which are mounted on a curved base that is connected to the newel portions of the balustrades. The handrail-contacting or engaging supports take the form of individual pads of a high hardness, low coefficient of friction in contact with a handrail with cotton layer, temperature resistance, such as PEEK or PAEK. PEEK (polyetheretherketone) and PAEK (polyaryletherketone) are semi-crystalline copolymers which are produced by polycondensation. It is important that these materials or segments produced, do not contain layers of carbon fiber or PTFE. Only non-reinforced polymers without layers and/or reinforcement materials will produce a satisfactory result regarding friction and wear. The pads are spaced apart from each other along the newel portion of the guide track, and are preferably screwed onto the guide track. The individual pads are each formed with a curved handrail-facing surface when viewed in side elevation so as to generally conform to the curves of the handrail as it moves over the newel.

The pads are preferably provided with a mirror finish which lowers the amount of friction generated by the handrail as it slides over the newel. The pads thus lower the heat generated in the newels, and also provide longer operational life with minimal wear on the pads and handrail.

It is therefore an object of this invention to provide an improved newel guide assembly for a moving handrail of a people mover such as an escalator or moving walkway.

It is an additional object of this invention to provide a handrail guide assembly of the character described which does not employ any moving components.

It is a further object of this invention to provide a handrail guide assembly of the character described which is a unitary structure and can be snap fitted onto the newel of the balustrade.

It is another object of the invention to provide a handrail guide assembly of the character described which generates low amounts of heat and has a long operational life.

These and other objects and advantages of the invention will become more readily apparent from the following detailed description of a preferred embodiment of the invention when taken in conjunction with the accompanying drawings, in which:

BEST MODE FOR CARRYING OUT THE INVENTION

Figure 1:
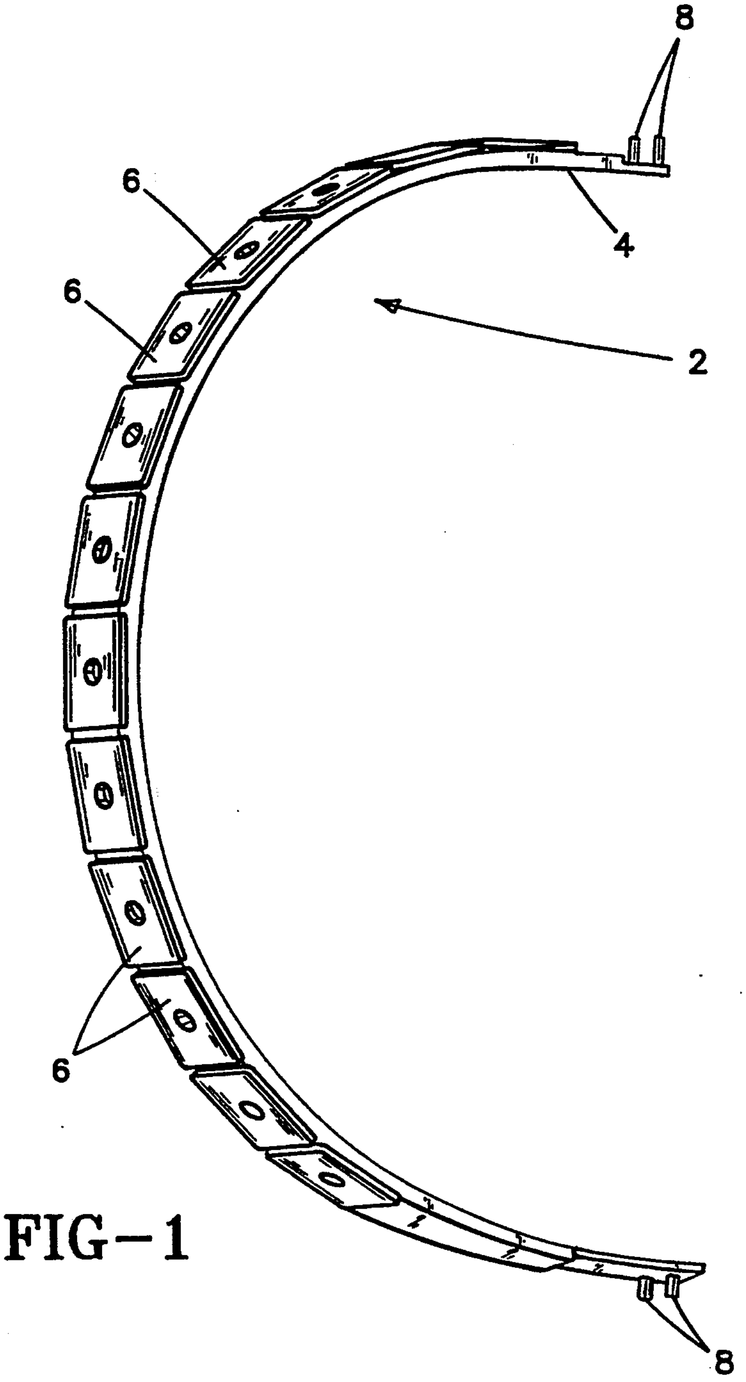
FIG. 1 is a perspective view of a handrail newel guide module which embodies the invention.

Referring now to the drawings, there is shown in FIG. 1 a newel handrail guide assembly module which incorporates this invention. The guide assembly module is denoted generally by the numeral 2 and includes a base supporting assembly 4 to which a plurality of spaced-apart handrail-contacting and guiding pads 6 are fastened. The ends of the module 2 are provided with a plurality of studs 8 for tying the ends of the module into the remainder of the handrail guide system.

Figure 2:
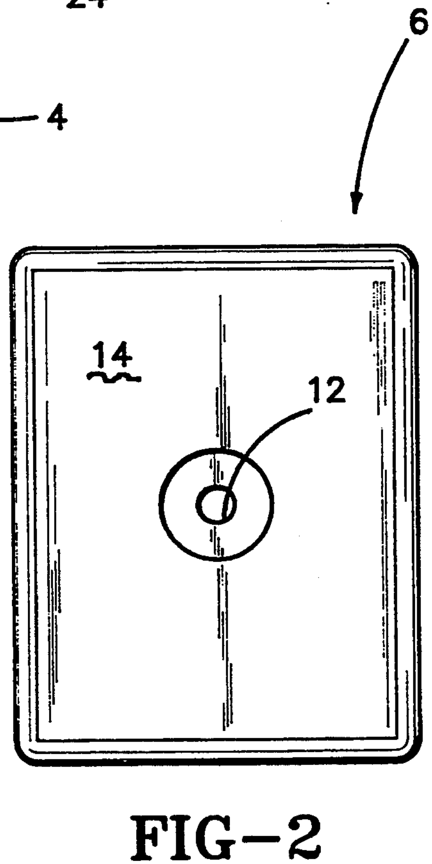
FIG. 2 is a plan view of one of the guide pads.
Figure 3:
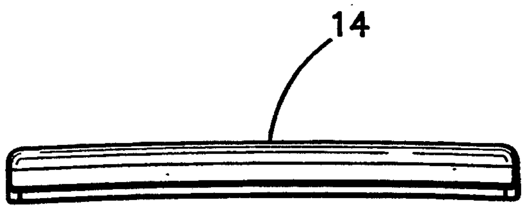
FIG. 3 is a side elevational view of the guide pad.
Figure 4:
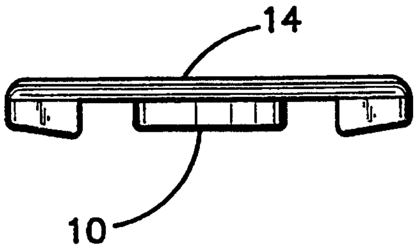
FIG. 4 is an end elevational view of the guide pad.

FIGS. 2–4 illustrate details of the pads 6. The pads 6 are provided with a central boss 10 that projects toward the base supporting assembly 4 and which is provided with a through passage 12 for receiving a headed fastening screw (see FIG. 5). The surface 14 of the pad 6 is the surface which engages the handrail, and it is formed with a radius in side elevation, as shown in FIG. 3, and is rectilinear in end elevation, as shown in FIG. 4. The configuration of the surface 14 allows maximum face-to-face contact between the pads 6 and the handrail so that heat may be dissipated evenly from the handrail, and so that stresses imparted to the pads 6 are spread out and not localized. This causes the assembly to run cooler, and to display less wear.

Looking at FIG. 1, it will be noted that the pads 6 are closely spaced so that they form an essentially continuous guide surface for the handrail. The entire newel area thus runs cooler and exhibits excellent wear characteristics.

Figure 5:
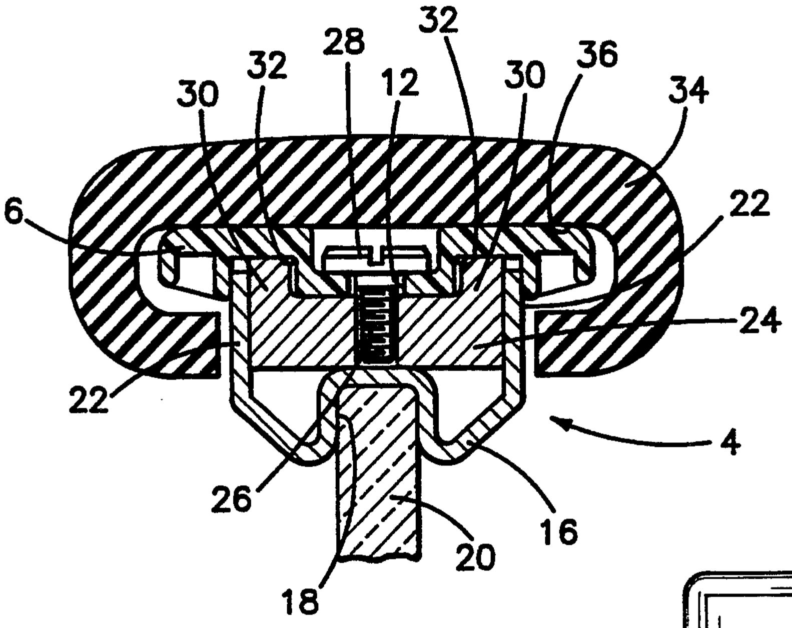
FIG. 5 is a cross-sectional view of the handrail, the handrail guide assembly, and the balustrade of the escalator or walkway.

Referring now to FIG. 5, details of the balustrade, guide assembly, and handrail interaction are shown. The base supporting assembly 4 includes a steel channel clamping portion 16 which includes a lower clamping portion 18 which clamps onto the balustrade 20, and an upper set of clamping arms 22 in which is clamped an extruded aluminum profile 24. The aluminum profile 24 has a plurality of threaded bores 26 which receive mounting screws 28 for securing the pads 6 in place. The profile 24 has a pair of upwardly directed flanges 30 which, along with the clamping arms 22, extend into parallel recesses 32 in the pads 6. A high degree of surface-to-surface contact is thus established between the profile 24 and the pads 6. The profile 24 is thus able to efficiently function as a heat sink which removes heat from the pads 6. This aids in lowering the temperature of the handrail 34 in the newels. It will be noted in FIG. 5 that the pads 6 are sized so as to maximize surface-to-surface contact with the inside surface 36 of the handrail 34.

A newel handrail guide which embodies the invention was constructed and compared with a newel guide that included ultra high molecular weight polyethylene guide tracks such as are used in the remainder of the prior art guide rails. Both assemblies were operated for twenty-eight hundred hours. The polyethylene assembly displayed consistently higher operating temperatures, by about fifty percent, than the newel guide of this invention, which increased with usage. The newel guide of this invention operated at a relatively constant temperature for the entire test period. Additionally, the polyethylene track displayed more than two times the wear of the guide system of this invention.

It will be readily appreciated that the newel guide assembly of this invention will provide cooler handrail operation with a longer operating life. The one-piece construction allows the guide to be assembled off site and enables it to be mounted on the newels quickly and easily. The intimate contact between the guide pads and the underlying aluminum heat sink provides efficient and improved operating temperature controls.

Since many changes and variations of the disclosed embodiment of the invention may be made without departing from the inventive concept, it is not intended to limit the invention otherwise than as required by the appended claims.

What is claimed is:

1. A moving handrail guide assembly for use in newel portions of an escalator or moving walkway balustrade, said guide assembly comprising:

a) a curved basal support mounted on said balustrade newel; and b) a plurality of plastic handrail-contacting guide pads fixed to said basal support, said guide pads being spaced apart from each other along said basal support to provide an immobile guide surface for the handrail.

2. The handrail guide assembly of claim 1 wherein said basal support extends continuously from one end of said newel to the other end of said newel.

3. The handrail guide assembly of claim 1 wherein said basal support includes an aluminum heat sink member to which said plastic pads are directly affixed, said plastic pads having formed therein recesses which receive mating arms on said heat sink member to increase the surface area contact between the heat sink and the pads.

4. The handrail guide assembly of claim 3 wherein said basal support further includes a steel channel clamp having a first clamping portion which clamps onto the balustrade, and a second clamping portion which clamps onto said heat sink member.

5. The handrail guide assembly of claim 1 wherein said pads are formed from a substantially pure polyetherketone copolymer.

6. The handrail guide assembly of claim 5 wherein said copolymer is selected from the group consisting of PEEK and PAEK.

7. The handrail guide assembly of claim 1 wherein said pads are sufficiently closely spaced so that at least approximately 90% of the portion of said handrail in said newels is directly contacted and supported by said pads.

* * * * *